United States Patent
Hu et al.

[11] Patent Number: 6,099,786
[45] Date of Patent: Aug. 8, 2000

[54] METHOD OF MAKING ACCURATE DIMENSION ALIGNMENT FILM FOR LCD

[75] Inventors: Dyi-Chung Hu, Hsinchu Shein; Sheng-Heisn Lin, Tainan Shein; Tai-Kang Wu, Hsinchu; Sywe N. Lee, Nei-Hu Taipei, all of Taiwan

[73] Assignee: Prime View International Co., Hsinchu, Taiwan

[21] Appl. No.: 08/605,953

[22] Filed: Feb. 23, 1996

[51] Int. Cl.[7] .................................................. B29D 11/00
[52] U.S. Cl. ..................... 264/400; 264/1.37; 264/1.7; 264/1.34; 264/132; 359/62; 359/76; 427/162; 427/163.1; 428/1
[58] Field of Search ..................... 264/248, 249, 264/400, 1.34, 1.9, 1.37, 1.7, 132; 65/58; 252/299.01; 359/62, 76; 427/162, 163.1; 428/1

[56] References Cited

U.S. PATENT DOCUMENTS

| | | |
|---|---|---|
| 4,132,464 | 1/1979 | Maeno . |
| 4,158,485 | 6/1979 | Mueller et al. ............................. 65/58 |
| 4,235,525 | 11/1980 | Berman et al. . |
| 5,008,049 | 4/1991 | Rose et al. ............................. 264/249 |
| 5,200,238 | 4/1993 | McArdle et al. ........................... 428/1 |
| 5,221,981 | 6/1993 | Kodera et al. ............................. 359/76 |

*Primary Examiner*—Mathieu D. Vargot
*Attorney, Agent, or Firm*—H. C. Lin

[57] ABSTRACT

A method of making accurate alignment layers in a liquid crystal display (LCD) cell is provided so that the LCD seal band can be placed as close to the pixel as possible. This method is implemented by ablating the apolyimide film on the glass substrates of the LCD cell to remove the alignment film where the sealing material is to be dispersed later. Thus, the sealing band can butt against the liquid crystal mixture without any clearance. In so doing, the display area is increased, and the reliability of the seal is improved.

14 Claims, 2 Drawing Sheets

METHOD OF MAKING ACCURATE DIMENSION ALIGNMENT FILM FOR LCD

BACKGROUND OF THE INVENTION

This invention relates to liquid crystal display (LCD), in particular to the method of making an LCD cell.

A liquid crystal display device as shown in FIG. 1 is composed of a pair of glass substrates with electrical conducting patterns enclosing an array of thin film transistor picture elements (TFT pixels) 3. The paired glass substrates 2, each having an orientation film, are arranged opposite to each other at a space defined by spacers and are sealed by an adhesive sealing material 2 to form a cell structure. An organic polymer film 4, such as polyimide film which is most widely used, can be used as an alignment film. In general, polyimide is obtained from heating polyamic acid, which is a precursor of polyimide, at high temperature such as 300° C. to cause imidization. Conventional method of making alignment film is using an Asahi Photosensitive Resin (APR) plate to print polyimide or polyamic acid solution on the surface of the glass substrate at first, and followed by evaporating out excess solvents and curing at high temperature. However, polyimide alignment films obtained from this process have severe shrinkage which results in crowning of plating structure around the film edge. For example, the cured polyimide film with thickness of 600~900 A° has about 800~1000 μm shrinkage in dimension from its original boundary for a 3"LCD cell, depending on the heating condition and polyimide type. The printing error of an APR plate to the glass substrate is around 100 μm. It is desirable not to have any polyimide films underneath the sealing band area due to poor adhesion between the polyimide and the sealing material. Moreover, polyimide film outside the seal band absorbs environmental moisture and results in poor reliability. Any poor seal in LCD cell can result in poor optical performance, poor reliability, and liquid crystal leakage, In order to increase the sealing reliability of the LCD cell, it is necessary to make the uncontacted area of the sealing material 5 with the polyimide alignment film 4 as large as possible. However, the enlargement of the uncontacted area is restricted due to dimensional limitation in the design of the LCD cell. Hence, for a conventional LCD design, there is a gap 1 (FIG. 1) around 800~1000 μm between the LCD seal and the display pixel to assure that there is no polyimide film under the seal band. Recently, there are increasing demands for a greater display panel size and for an improvement in the LCD quality and reliability. From the above mentioned problems, a well controlled dimension for polymer alignment film is very difficult to obtain in conventional manufacturing method but is very important for the LCD quality.

SUMMARY

An object of this invention is to provide a method of making the alignment layer in an LCD cell such that the LCD seal band can be placed as close to the pixel as possible. Another object of this invention is to increase the display area of an LCD. Still another object of this invention is to obtain high reliability. A further object of this invention is to obtain good optical performance.

These objects are achieved in this invention by ablating the substrates to remove the alignment film where the sealing material is to be dispersed later. Thus the sealing band can butt against the liquid crystal mixture without any clearance.

DETAILED DESCRIPTION OF THE PREFERRED EMBODIMENT

Figure 1:
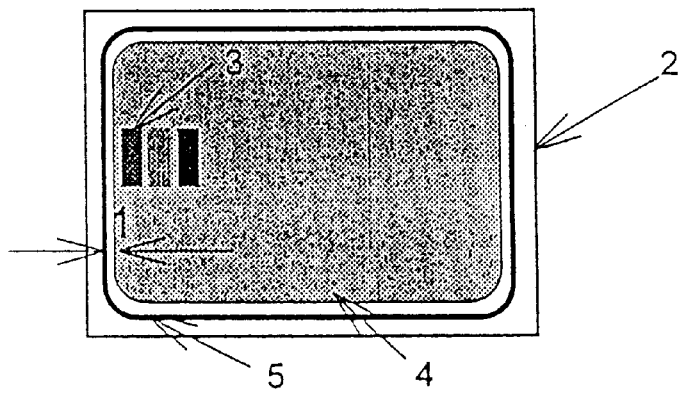
FIG. 1 illustrates a top view of a liquid crystal display cell with a gap between the pixel and the LCD seal band according to prior art.
Figure 2:
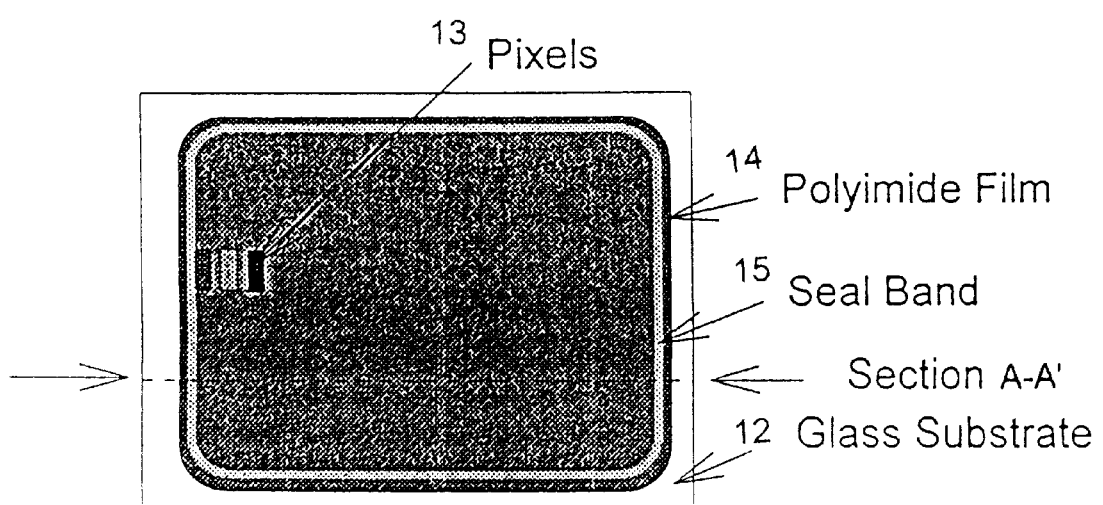
FIG. 2 illustrates a top view of a LCD cell prior to the removal of the polyimide film along section A—A' in FIG. 2 at the seal band region according to this invention.
Figure 3:
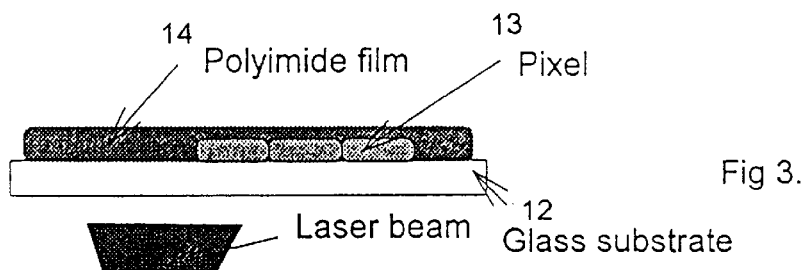
FIG. 3 is a partly diagrammatic side view showing the glass substrate with pixels which are coated with a layer of polyimide film.
Figure 3A:
FIG. 3(a) is a partly diagrammatic side view showing the step of removing the polyimide film which is at the seal band region by a laser beam.
Figure 3B:
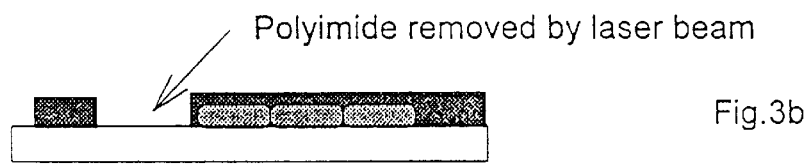
FIG. 3(b) is a partly diagrammatic side view showing the pixel-containing substrate having a well controlled polyimide film after a portion of the polyimide film at the seal band has been removed by laser ablation.
Figure 4:
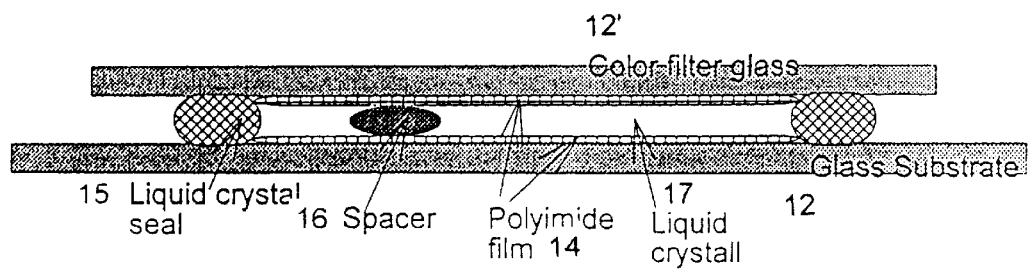
FIG. 4 is a side view of a liquid crystal display cell.

Referring to FIG. 4, a liquid crystal display cell comprises two transparent electrode-containing substrates, e.g. color filter substrates 12' and thin film transistor substrate 2, oppositely and spatially arranged and substantially in parallel to each other with a liquid crystal mixture 7 filling in-between. The transparent electrodes 12 and 12', which are electrically conductive layers, are formed on a transparent substrate of glass or a film of plastic such as polyethylene terephthalate (PET) or polyether sulfone (PES), which can be deposited by a sputtering method, a vapor deposition method, or a coating method. FIG. 2 shows a top view of a liquid crystal display having a glass substrate 12, pixels 13 and a polyimide film 14 with a dimension larger than that of the seal band 15 contour. Onto the surface of the transparent electrodes 12, a layer of polyimide alignment film 14 is coated as shown in FIG. 4 by a spin coating method or a roller coater as shown in FIG. 4. The alignment films may include a film of organic film, such as polyimide, polyvinyl alcohol, polystyrene, polyamideimide, polyester, polyesterimide, polycarbonate, cellulose resin, melamine resin, urea resin, and acrylic resin. A preferred alignment layer is a polyimide film deposited by coating with a roller coater either a polyimide solution or a polyamic acid solution to the substrates containing the transparent electrode. In the roller coating step, the APR plate should at least have a dimension of 1000 μm larger than the pixel-containing area to compensate the printing error and the shrinkage of the polyimide film. The coated alignment layer 14 is cured inside an oven or on a hot plate prior to rubbing treatment to assure a good alignment of liquid crystals by a rubbing machine in a desired direction. As shown in FIG. 3, the substrates with pixels 13, which are coated with a layer of polyimide film 14, undergo a rubbing treatment in a specific direction. The substrates then undergo laser ablation to remove polyimide film which is at the location where the sealing material 15 is later dispensed as shown in FIG. 3(a). This process can proceed by either scanning ultra-violet (UV) laser beam on the top of the glass substrate or controlling the substrate movement underneath the laser beam. Commercial tools such as the Model ELA 9100 by XMR are available for such an application. The laser beam intensity is adjusted to around 0.1 J/cm$^2$ such that the polyimide film can be easily removed without damaging the metal lines underneath. A publication on "Ultra Laser Ablation of Organic Polymers" by R. Srinivasan and B. Braren in *Chem.Rev.* 1989, vol. 89, 1303–1316, can be taken as a reference for removing organic materials by using UV laser. The threshold of polymer removal is less than 0.1 J/cm$^2$ by using Excimer laser with a wavelength of 193 nm. However, the threshold of laser energy for metals such as Al and Cr is 0.2 and 0.24 J/cm$^2$, respectively. (Reference: "Metal Film Removal and Patterning Using a XeCl Laser" by J. E. Andrew, P. E. Dyer, R. D. Greenough and P. H. Key in *Appl.Phys.Lett* 1983, vol.43 1076–1078) Hence, the selectivity of UV laser irradiation is good enough to remove polymer layers without damaging the underlying metal lines in the display. In addition, the zone affected by the heat is minimized by using UV lasers. Thus, the wavelength selected from the Excimer laser can be 318, 245 or 198 nm. The process of laser ablation to remove polyimide can proceed prior to the rubbing treatment. FIG. 3(*b*) shows the pixel-containing substrate obtained with a well controlled alignment film.

The spacer beads 16 are dispersed onto the surface of one of the transparent polyimide-coated substrates, while a sealant 15 of the flexible epoxy adhesive is screen printed onto the surface of the other substrates to form a sealing structure. Usually, the epoxy used for the seal is premixed with rod or sphere spacer with predetermined diameters to assure the accuracy of the cell gap between the two substrates. The epoxy is available from vendors, such as XN-21-S from Mitsui Toatsu Chemicals. The spacer beads 16 may be dispersed by a spraying method or by a spinner method at a density of 60–1000 beads/mm$^2$ depending on the cell size and the cell liquid crystal material. The spacer beads may be made of a wide variety of known materials including alumina, silica, and plastic type. After the two substrates are aligned and fixed by curing the epoxy sealing material, the cell can be separated by either the scribing and breaking method, or dicing as is commonly practiced in conventional liquid crystal cell fabrication.

The liquid crystal cell is filled up with liquid crystal 17 from a liquid crystal injection hole and is sealed with an UV-light curable sealing material. A conventional liquid crystal, such as nematic, smetic, chiral smetic and cholesteric can be used in the present invention. In this way, the liquid crystal display cell manufactured according to this invention can obtain a well controlled alignment film and thus good sealing reliability and optical performance.

What is claimed is:

1. A method of making alignment layers with accurate dimensions in a liquid crystal display (LCD) cell having two transparent substrates, one containing thin film transistors (TFT) and another containing color filters (CF), liquid crystal mixture between said substrates, spacers for maintaining the gap between said substrates, an alignment layer inside each one of said substrates, and a seal band for sealing the periphery of said substrates, comprising the steps of:

depositing a transparent electrically conductive electrode on each one of said substrates, coating a layer of alignment film on the surface of each one of said substrates, curing said alignment film, rubbing said alignment film in a desired desirable direction, then ablating the alignment film selectively to remove the alignment film where said sealing band is to be located, dispersing said spacers onto the surface of a first one of the two transparent substrates, screen printing a sealant onto the ablated surface of a second one of the two transparent substrates to form said sealing band, aligning the said substrates, filling the space between said substrates with said liquid crystal mixture by injecting through an injection hole, and sealing said liquid crystal cell by curing said sealant.

2. A method as described in claim 1, wherein said liquid mixture is selected from a group of liquid crystals consisting of twisted nematic (TN), super twisted nematic (STN) and ferroelectrics.

3. A method as described in claim 1, wherein said alignment film is selected from a group of organic films consisting of polyimide, polyvinyl alcohol, polyvinyl acetal, polyvinylchloride, polystyrene, polyamide, polyamideimide, polyester, polyesterimide, polycarbonate, cellulose resin, melamine resin, urea resin, and acrylic resin.

4. A method as described in claim 1, wherein said alignment film is modified by ultra-violet curing to modify the orientation of the liquid crystal mixture.

5. A method as described in claim 1, wherein said coating step is selected between roller coating and spin coating.

6. A method as described in claim 1, wherein said step of curing alignment film is selected between heating in an oven and heating on a hot plate.

7. A method as described in claim 1, wherein said step of ablating said excess alignment film is implemented by laser.

8. A method as described in claim 7, wherein said laser is a Excimer laser with a wavelength selected from 318, 245 and 198 nm.

9. A method as described in claim 7, wherein said laser is a Nd-YAG laser operating in a triple frequency UV range.

10. A method as described in claim 7, wherein the beam of said laser is scanned.

11. A method as described in claim 7, wherein said ablation is implemented by moving said substrate.

12. A method as described in claim 1, wherein said sealant is dispensed.

13. A method as described in claim 1, wherein said sealant is screen printed.

14. A method as described in claim 1, wherein said step of ablating and said step of rubbing are reversed.

* * * * *